United States Patent
Adjaz et al.

(12)

(10) Patent No.: US 12,141,255 B2
(45) Date of Patent: Nov. 12, 2024

(54) METHOD FOR AUTHENTICATING A USER ON CLIENT EQUIPMENT

(71) Applicant: IDEMIA IDENTITY & SECURITY FRANCE, Courbevoie (FR)

(72) Inventors: Aghiles Adjaz, Courbevoie (FR); Claude Bauzou, Courbevoie (FR); Jérôme Beaudeau, Courbevoie (FR); Jean-Luc Le Floch, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 492 days.

(21) Appl. No.: 17/304,145

(22) Filed: Jun. 15, 2021

(65) Prior Publication Data

US 2021/0397687 A1 Dec. 23, 2021

(30) Foreign Application Priority Data

Jun. 17, 2020 (FR) ...................................... 2006332

(51) Int. Cl.
*G06F 21/32* (2013.01)
*G06F 21/43* (2013.01)
*G06F 21/60* (2013.01)
*G06F 21/10* (2013.01)

(52) U.S. Cl.
CPC .............. *G06F 21/32* (2013.01); *G06F 21/43* (2013.01); *G06F 21/602* (2013.01); *G06F 21/107* (2023.08)

(58) Field of Classification Search
CPC ........ G06F 21/32; G06F 21/43; G06F 21/602; G06F 21/107; G06F 21/36; H04W 12/068
See application file for complete search history.

(56) References Cited

U.S. PATENT DOCUMENTS

| | | | |
|---|---|---|---|
| 10,547,610 B1* | 1/2020 | Faibish | H04L 9/3231 |
| 2015/0121514 A1* | 4/2015 | Park | A61B 5/1172 |
| | | | 726/19 |
| 2018/0212782 A1* | 7/2018 | Csik | H04L 9/3268 |
| 2019/0103971 A1* | 4/2019 | Keuffer | H04L 9/3218 |

(Continued)

FOREIGN PATENT DOCUMENTS

| | | |
|---|---|---|
| EP | 2869528 A1 | 5/2015 |
| WO | 2019/209677 A1 | 10/2019 |

*Primary Examiner* — Han Yang
(74) *Attorney, Agent, or Firm* — WOMBLE BOND DICKINSON (US) LLP (57) ABSTRACT

A method of authenticating a user on client equipment, the user equipped with a personal terminal, the method wherein it comprises implementing by data processing means in said client equipment the following steps: (a) When said user's personal terminal is in proximity to said client equipment, receiving from the terminal and temporarily storing on data storage means in the client equipment: —a reference biometric data item of the user; and—at least one alphanumeric user authentication data item; stored on the data storage means in the terminal; (b) Identifying said user via biometric recognition from a candidate biometric data item of the user and the reference biometric data item(s) stored on the data storage means in the client equipment; (c) Using at least one alphanumeric authentication data item of the identified user stored on the data storage means in the client equipment, for authentication of said user.

16 Claims, 2 Drawing Sheets

(56) References Cited

U.S. PATENT DOCUMENTS

2019/0327227 A1\* 10/2019 Tobkes .................... H04L 67/52
2020/0169561 A1\* 5/2020 el Khoury ............. H04L 63/102
2020/0233943 A1\* 7/2020 Adjaz ................. H04L 63/0861
2021/0019746 A1\* 1/2021 Adjaz ................. H04L 63/0861

\* cited by examiner

METHOD FOR AUTHENTICATING A USER ON CLIENT EQUIPMENT

The project leading to this application has received funding from the European Union's Horizon 2020 research and innovation programme under grant agreement No 826293.

CROSS-REFERENCE TO RELATED APPLICATIONS

This application claims priority pursuant to 35 U.S.C. 119(a) of France Patent Application No. 2006332, filed Jun. 17, 2020, which application is incorporated herein by reference in its entirety.

TECHNICAL FIELD OF THE INVENTION

The invention relates to a method of authenticating a user on client equipment, wherein the user is equipped with a personal terminal.

STATE OF THE ART

It is known in many organizations (companies, public bodies, places accessible to the public, etc.) to set up a computer system made up of workstations secured by login/password pair, allowing clients to access all or part of the IS.

More specifically, each user has an identifier (the login), which is usually their name, e-mail address, a number (telephone, social security, etc.) or any other personal data; and a confidential password. This pair is often called "credential".

When they want to use a workstation, they require authentication (for example, by pressing CTRL+ALT+DELETE on the keyboard), and an authentication window appears for entering their username and password.

Most often, the client workstation generates a hash value of the password entered (by a hash function) and interrogates a server of the system to know whether, for the user designated by the entered identifier, this candidate hash value matches with an expected reference hash value.

Although this system generally provides complete satisfaction, there are user "behavior" issues linked to the fact of communicating an identifier/password pair from one user to another in order to "help out", or even writing it on paper.

For example, it has been observed in hospitals that, although each medical staff member has their own identifier/password pair, all medical staff members use the same one to authenticate with the hospital IS, and in addition, the pair in question is written on a post-it stuck next to each medical machine or workstation. The pair could be used by anyone (medical staff, patients, visitors, etc.) and this poses a huge security problem that can affect patients' lives or privacy.

Thus, the securing of information systems has become a top priority in view of the proliferation of attacks on them and the sensitivity of the information that can be held.

In order to avoid password manipulation problems, it has been proposed to add a biometric "brick", such as Windows Hello, to the client workstations.

The input of the identifier/password pair is replaced by biometric authentication based on a biometric feature such as a fingerprint, the face or the iris of the user. The latter no longer needs to know a password.

However, the problem with this solution is that it is based on the fact that each workstation is user-specific equipment. Thus, biometric data of the user is stored on his workstation and any biometric verification is made with respect to the stored biometric data.

This solution is not applicable when the workstation is shared with all the members of an organization, as in the case of a hospital mentioned before, for several reasons:

There should be a centralized biometric database, which is not likely to be acceptable with the laws and regulations in force in the given country (for example, GDPR in Europe);

The reference biometric data of all members of the organization should be recorded on a case-by-case basis, which would be very long and cumbersome;

Solutions available on the market should be able to support this functionality (which is not obvious).

It would thus be desirable to have a simple, universal, reliable solution, complying with the regulations in terms of personal data, and totally secure for authenticating a user on any workstation of an information system.

BRIEF DESCRIPTION OF THE INVENTION

According to a first aspect, the invention relates to a method of authenticating a user on client equipment, the user being equipped with a personal terminal, the method being characterized in that it comprises implementing by data processing means in said client equipment the following steps:

(a). When said user's personal terminal is in proximity to said client equipment (2), receiving from the terminal and temporarily storing on data storage means in the client equipment:
a reference biometric data item of said user; and
at least one alphanumeric user authentication data item; stored on the data storage means of the terminal;

(b). Identifying said user via biometric recognition from a candidate biometric data item of the user and the reference biometric data stored on the data storage means of the client equipment;

(c). Using the at least one alphanumeric authentication data item of the identified user stored on the data storage means in the client equipment, for authentication of said user.

According to other advantageous and non limiting characteristics:

Step (b) comprises identifying, among the reference biometric data item(s) stored on the data storage means in the client equipment, the reference biometric data item matching with the candidate biometric data item of the user.

Step (b) comprises comparing the candidate biometric data item with every reference biometric data item stored on the data storage means in the client equipment.

The candidate biometric data item and a reference biometric data item match if the distance thereof according to a given comparison function is less than a predetermined threshold.

The at least one alphanumeric authentication data item used in step (c) is the one associated with said reference biometric data item matching with the candidate biometric data item of the user.

The method comprises a step (d) of deleting said reference biometric data and at least one alphanumeric user authentication data item from the data storage means of the client equipment.

Step (d) is implemented in accordance with a predetermined time pattern.

Said terminal is determined in the vicinity and step (a) is carried out when a short-range wireless connection is established between the terminal and the client equipment, in particular a Bluetooth Low Energy or Ultra-Wide Band connection.

Step (b) comprises generating the candidate biometric data item from a biometric trait of the user furnished by biometric acquisition means of the equipment.

The method comprises implementing by data processing means of the terminal a preliminary step (a0) of obtaining the at least one alphanumeric authentication data item of the user, and generating the reference biometric data item from a reference biometric trait of the user.

Step (a0) comprises encrypting said reference biometric data item and at least one alphanumeric user authentication data item with a public key of the client equipment, step (a) comprising the decryption thereof by the data processing means of the client equipment with a private key of the client equipment.

The at least one alphanumeric user authentication data item comprises a user password or a hash value of a user password.

According to a second aspect, the invention proposes client equipment comprising data storage means and data processing means, characterized in that said data processing means are configured to:

When a user's personal terminal is in proximity to said client equipment, receiving from the terminal and temporarily storing on the data storage means:
  a reference biometric data item of the said user; and
  at least one alphanumeric user authentication data item;
    stored on the data storage means of the terminal;
Identifying said user via biometric recognition from a candidate biometric data item of the user and the reference biometric data item(s) stored on the data storage means;
Using the at least one alphanumeric authentication data item of the identified user stored on the data storage means for authentication of said user.

According to a third aspect, the invention relates to an assembly comprising client equipment according to the second aspect, and at least one user personal terminal comprising data storage means storing:
  a reference biometric data item of said user; and
  at least one alphanumeric user authentication data item.

According to a fourth and a fifth aspect, the invention relates to a computer program product comprising coding instructions for executing a method according to the first aspect of authentication of a user on client equipment; and a storage means readable by computer equipment on which a computer program product comprises coding instructions for executing a method according to the first aspect of authentication of a user on client equipment.

DESCRIPTION OF THE FIGURES

Other characteristics, purposes and advantages of the present invention will be seen from the following detailed description with regard to the appended figures, provided by way of non limiting example, and wherein.

DETAILED DESCRIPTION

Architecture

Figure 1:
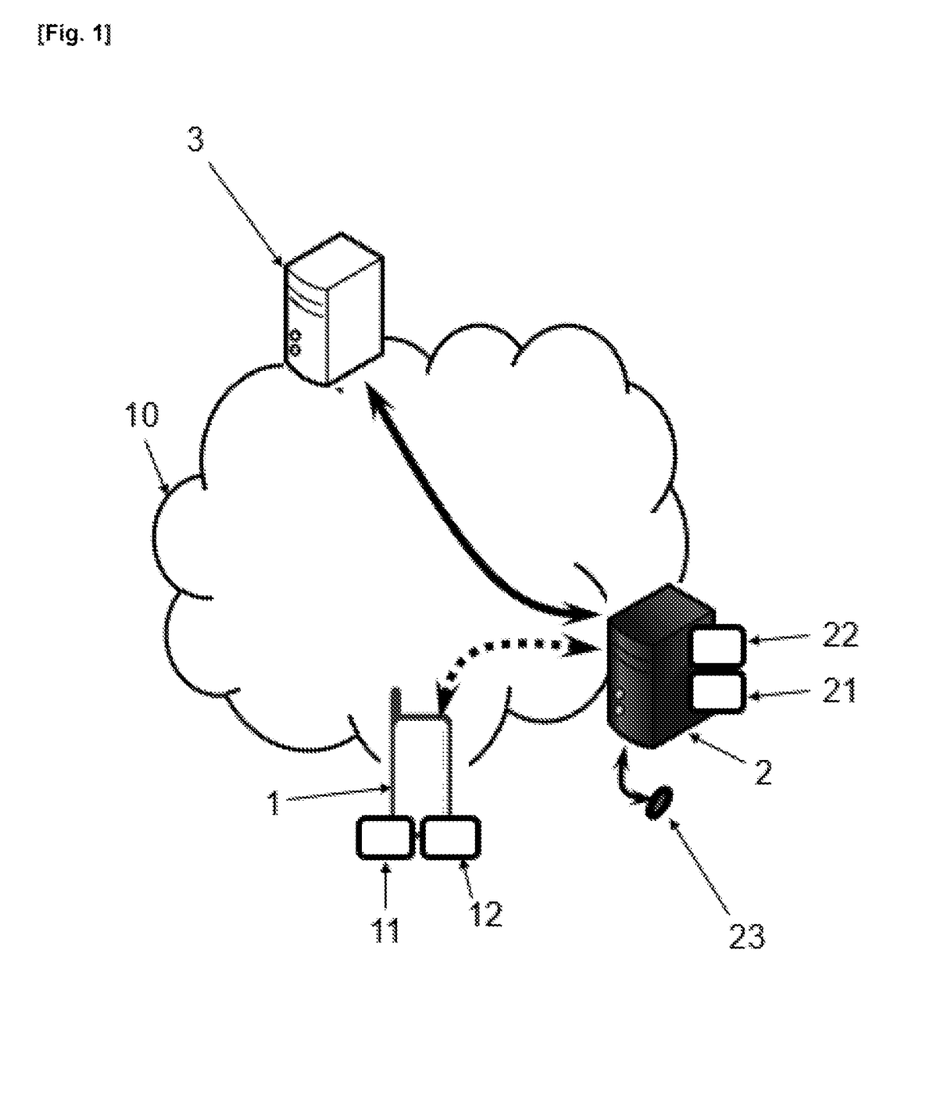
FIG. 1 schematically shows a system for the implementation of the method according to the invention.

Referring to [FIG. 1], a computer system architecture has been schematically represented in which the present method of authenticating a user on client equipment 2 is implemented, in view of the authorization of the user to access said computer system.

Preferably, one or more pieces of client equipment 2 are conventionally connected via a secure network 10 to at least one authentication server 3, referred to as "Security Accounts Manager", SAM, each client equipment 2 allowing an authenticated user access to the functionalities of the client equipment 2 and/or to resources shared in the secure network 10.

It is assumed that said computer system is already configured for "conventional" authentication, i.e., that the user (and preferably a plurality of users) has at least one alphanumeric personal authentication information forming a "credential" of the user, in particular an identifier and/or a password (but also possibly a telephone number, an e-mail address, etc.), and that he is authorized to authenticate himself on all or part of the client equipments 2 by means of alphanumeric personal authentication information (by comparison with an expected alphanumeric personal authentication information held by the SAM 3) in order to access the functionalities of the client equipment 2 and thereby all or part of the shared resources. Preferably, on the same client equipment 2, a plurality of users can identify themselves, i.e., each client equipment 2 is not personal to a user.

Of course, it is quite possible that users do not all have the same access rights and therefore may ultimately have access to different shared resources. It will be understood that different users have different alphanumeric authentication information because of the individual character thereof. Obviously, it is still possible for users to communicate alphanumeric information to each other (that is, one authenticates with the information of the other), but such behavior is to be avoided because of the security risks that it entails, and it will be seen that in the context of the present invention this will no longer work.

It will be understood that here the notion of "alphanumeric" information means that the user enters this information conventionally on the keyboard, and that it excludes, for example, biometric information, which is acquired via dedicated means. In the remainder of the present description, the example in which there are two alphanumeric information elements: an identifier/password pair, will be taken. It should be noted that this notion of alphanumeric information will also encompass the case in which a hash value (i.e., a "hash" as obtained by a hash function) is a manipulation of an original alphanumeric information. Indeed, rather than comparing "non-encrypted" alphanumeric personal authentication information, the hash values thereof are compared (typically the case of passwords; it is recalled that this can only work for information prints of alphanumeric nature and not for hash values, for example, biometric data) as this makes it possible to keep the original alphanumeric information secret because it is not possible to trace the original alphanumeric information from the hash value thereof. Therefore, in the remainder of the present description, it will be understood that the term personal authentication alphanumeric information can designate both "as is" information and a print of a first alphanumeric information.

It is emphasized that authentication is "conventional", that is, that the present method is integrated into an existing schema: there is no need to modify either the software used (a layer on top will be simply added, there is no brick replacement as in Windows Hello) or the expected alphanumeric personal authentication information already stored (that is, users continue to use the same identifiers/password as before).

As will be seen, it is also assumed that the user (and preferably several or even all users) is equipped with a personal terminal 1.

According to a preferred embodiment, it is a mobile terminal of the smartphone or touch-screen tablet type, but it may be a smart card (of the smart card type), a USB token, etc. Any electronic device personal to the user comprising data processing means 11 (that is, a calculator such as, for example, a processor, a microprocessor, a controller, a microcontroller, an FPGA, etc.), data storage means 12 (a flash memory, a microprocessor memory, etc.), and capable of communicating with the client equipment 2 may be used as terminal 1. As will be seen, this is a short-range communication, that is, the terminal 1 and the client equipment 2 are not, for example, just two pieces of equipment connected via the Internet.

In a preferred embodiment, the terminal 1 is capable of implementing wireless (short-range) communication with the client equipment 2, either directly (for example, via Bluetooth, and in particular Bluetooth Low Energy—BLE, or Ultra-Wide Band—UWB), or indirectly (for example, by connecting via Wi-Fi to a gateway in said secure network 10). It will be understood that the user most often does not even have to manipulate the terminal 1: after a first pairing, as soon as the terminal 1 is within range, the connection is made automatically.

Alternatively or additionally, the terminal 1 is capable of implementing a wired communication with the client equipment 2, for example, via a port or cable (USB, Thunderbolt, etc.) if the terminal 1 is a smartphone or a token, or else a card reader if the terminal 1 is a smart card.

It will be understood that this does not exclude the existence of a second "long range" connection, for example, if the terminal 1 is itself connected to a mobile communication network in parallel (such as UMTS or LTE), but the present method will use only said short range communication.

Preferably, the client equipment 2 (and optionally the terminal 1) is capable of generating a biometric data using a biometric trait of an individual. The biometric trait can, for example, be the shape of the face, an iris of the individual, a fingerprint of the individual, etc. The extraction of the biometric data is performed by processing the image of the biometric trait, which depends on the nature of the biometric trait. Methods for processing a variety of images in order to extract biometric data are known to the person skilled in the art. By way of non limiting example, the extraction of the biometric data can comprise an extraction of particular points or of a shape of the face in the case where the image is that of the individual's face.

The client equipment 2 may be any local workstation, laptop, machine, station, etc., to which the user must authenticate. Again it comprises data processing means 21 and data storage means 22, and advantageously biometric acquisition means 23, typically an image sensor (for example, a digital photo camera, a digital camera, a scanner if the trait is a fingerprint, etc.), adapted to acquire at least one image of a biometric trait of an individual.

It should be noted that the biometric acquisition means 23 can in practice be either integrated into the client equipment 2 (for example, many laptops have a fingerprint scanner on the keyboard) or discrete from the client equipment 2 and simply connected, in particular via a wired connection (typically in the form of a webcam). It is assumed that the client equipment 2 has confidence in these biometric acquisition means 23.

In an embodiment, the client equipment 2 carries out an authentication of the individual, that is, it compares candidate biometric data, freshly acquired from the individual, to a single biometric data item called reference, assumed to come from the same individual, in order to verify that the individual from whom both data have been obtained is one and the same.

In this case, the reference biometric data item used for authentication is, as will advantageously be seen, a data item stored in an identity document of the individual (for example, an image of the face appearing on an identity document, or else an image of the face or of at least one iris of the individual stored in a radiofrequency chip contained in the document) or else derived from a biometric trait acquired under controlled conditions.

Principle

The present invention proposes to add a second biometric authentication level while avoiding the need for a centralized biometric database by astutely using the user's personal terminal 1 as a means of temporarily providing a reference biometric data item of the user.

More specifically, the idea is to encapsulate the "traditional" credential (the alphanumeric personal authentication information) in a new credential including the biometrics stored on the terminal 1 thereof. At the moment when the user approaches client equipment 2, the new credential is transmitted to the latter transparently via the connection with the terminal 1 for temporary storage on the client equipment 2, and when he chooses to authenticate himself via this solution, a candidate biometric data item (freshly acquired) can be compared with the reference biometric data stored (temporarily) on the equipment 2. Once biometric identification is completed, the new credential can be decapsulated to recover the traditional credential and used for conventional authentication.

It can therefore be seen that there is no problem of compliance with the privacy regulations, since the storage of the reference biometric data is only temporary: there is no need to have the reference biometric data item of a user when the latter is not in the vicinity of the client equipment 2, and it can be reloaded later when the user approaches again.

Moreover, whereas the known solutions had only one authentication factor (alphanumeric personal authentication information or biometrics), a second factor here is the possession of the terminal 1. In other words, it is a strong authentication ("what I have" and "what I am"). Thus, even if a user tries to defraud biometric recognition by making himself, for example, a mask of an authorized user, he would be rejected since he does not have his terminal 1.

Finally, it is well understood that such a solution is particularly ergonomic and convenient for users since they have nothing to do except be in front of the client equipment 2 (at worst, connect the terminal 1).

Enrollment

Figure 2:
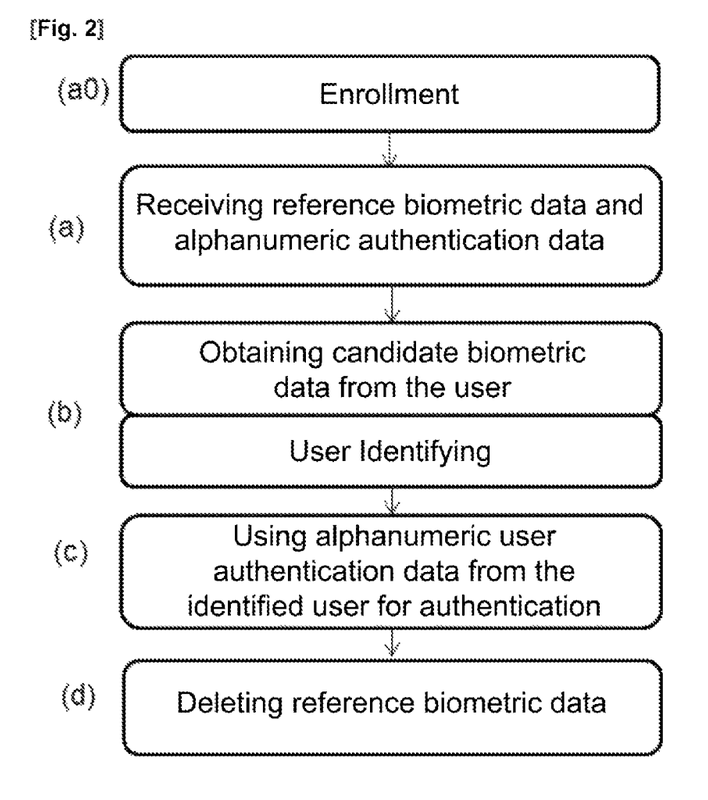
FIG. 2 schematically shows the steps of a preferred embodiment of the method according to the invention.

In a preferred embodiment, referring to [FIG. 2], the method comprises a preliminary step (a0) of "enrollment" enabling the reference biometric data item of the user and the at least one alphanumeric user authentication data item to be made available on the data storage means 12 of the terminal 1. To this end, an application can be installed on the terminal 1.

This step can be implemented long before the rest of the method and does not need to be repeated with each occurrence of the method (for example, it can be done once per year).

Typically, this step comprises:

Obtaining the at least one alphanumeric authentication data item from the user (the user is advantageously simply asked to enter it on the terminal 1).

Generating, by the data processing means 11 of the terminal 1, the reference biometric data item from a reference biometric trait, which is either associated with an official document (in particular an identity document such as a passport or an identity card) or acquired by the user (for example via biometric acquisition means of the terminal).

The second part can be carried out in many ways. For example, the user can directly retrieve on his terminal 1 the biometric trait stored in a radiofrequency chip contained in the document (if the equipment 1 has an NFC radiofrequency reader), take a photograph of this document with the camera in his terminal 1, or even a photograph of himself.

If a high level of security is required for access to the client equipment 2, it may be necessary to have the biometric data generated as reference data verified and validated by a control authority. For example, said photograph of the individual may have to be taken in the presence of a representative of the authority (for example at a counter in the city hall).

This verification can be performed in numerous ways, and simply consists in verifying that the reference biometric data item submitted for verification is consistent with an official document.

Advantageously, step (a0) comprises, as explained, computing the hash value of at least one alphanumeric authentication data item obtained, for example of the password. Preferably, the initial alphanumeric authentication data is replaced by the hash value thereof (that is, the first one is deleted).

Finally, step (a0) advantageously comprises encapsulating the reference biometric data item of said user and the at least one alphanumeric authentication data item of the user (where appropriate the hash value), in the form of a new credential. This generally consists in encrypting the reference biometric data item of said user and the at least one alphanumeric authentication data item of the user. For this purpose, the data processing means 11 of the terminal 1 apply, for example, an asymmetric encryption function, in particular with a public key of the client equipment 2. Thus, even if a third party would intercept this credential, they could not trace back to the reference biometric data item or the alphanumeric authentication data item of the user.

Generally, it will be understood that step (a0) may be implemented in any way that allows the storage on the terminal 1 of the reference biometric data item and the at least one alphanumeric user authentication data item.

Authentication

The method for authenticating a user on the client equipment 2 will now be described. This method is carried out by the data processing means 21 of the client equipment 2.

As explained, it is assumed that terminal 1 has a biometric reference data item from said user and at least one alphanumeric authentication data item of the user. As explained, said data can be obtained preliminarily during an enrollment step (a0).

In a first step (a), when said user's personal terminal 1 is close to said client equipment 2, said reference biometric data and at least one user authentication alphanumeric data (in particular encapsulated) are received from the terminal 1 and temporarily stored on the data storage means 22 of the client equipment 2.

Preferably, the storage is anonymized, it suffices simply to associate together (that is, store in an associated manner) a reference biometric data item and an alphanumeric authentication data item when they are received together, since they correspond to the same user. To rephrase again, it is assumed that a reference biometric data item and at least one alphanumeric authentication data item associated come from the same user.

This step (a) is advantageously implemented automatically as soon as a terminal 1 is detected in the vicinity, that is, for each terminal 1 of a user potentially authorized to authenticate himself on the client equipment 2 (that is, storing a reference biometric data item and at least one alphanumeric data item authenticating the user thereof). This proximity detection can quite simply be the establishment of the connection, in particular if it is a short-range wired or wireless connection. It may be initiated by one or other of the terminal 1 and the client equipment 2. In the example of a BLE, upon pairing, the transfer and storage are carried out. Alternatively, it is possible to determine a distance, for example via RSSI (Received Signal Strength Indication), and consider that the terminal 1 is close if it is less than a predetermined threshold, in order to limit the volume of data to be stored if, for example, many users are in the same room.

It should be noted that, of course, the implementation of step (a) may be subject to the storage means 22 not already storing said reference biometric data and at least one alphanumeric user authentication data. Indeed, even if the storage is temporary (the modalities will be discussed below), it is quite possible that the user briefly leaves the client equipment 2 (for example to go to another room) and return, so that the connection will be re-established but there will be no need to retrieve the said reference biometric data item and at least one alphanumeric user authentication data item.

Step (a) may comprise decrypting the data if they have been encrypted, in particular assuming that the client equipment 2 has a private key complementary to the public key used for encryption.

It is reiterated that step (a) is preferably automatic, that is, the user does not need to request the transfer of his data and this can be done even before the user indicates that he wishes to authenticate himself on the client equipment 2. Thus, it is quite possible that the client equipment 2 ultimately stores the data of several other users who have just passed by and who ultimately will not use the client equipment 2, but this poses no problem since the storage remains temporary.

At the end of step (a), it is assumed that the client equipment 2 has a temporary reference biometric database each associated with at least one alphanumeric authentication data item (it is reiterated that the associated data correspond to the same individual).

In a main step (b), the data processing means 21 of the client equipment identify said the user via biometric recognition from a candidate biometric data item of the user and the reference biometric data item(s) stored on the data storage means 22 in the client equipment 2.

Here, said user in question is a "target" user, in this case the user wishing to authenticate himself on the client equipment, and for which a candidate biometric data item is available (and not any nearby user as in step (a)).

This step is indeed an identification step and not an authentication step because there may be more than one stored reference biometric data item, in particular if there are several users nearby. Stated otherwise, it is a step for identifying, among the reference biometric data item(s) stored on the data storage means 22 in the client equipment 2, the reference biometric data item matching with the candidate biometric data item, this reference data item being said "target" (that is, from the target user). For this purpose, step (b) typically comprises comparing the candidate biometric data item with each reference biometric data item, so as to identify the reference biometric data item matching with the candidate biometric data item.

It should be noted that it is perfectly possible for no reference biometric data item to match with the candidate biometric data item, in particular if the user does not have his own terminal 1 (whether he has forgotten it or is fraudulently attempting to authenticate himself). Thus, even having obtained the credentials of a valid user and/or by putting on a mask of this user, a third party could not authenticate itself since the reference biometric data of this user would not be stored by the equipment 2.

In a known manner, the candidate biometric data item and a reference biometric data item match if the distance thereof according to a given comparison function is less than a predetermined threshold.

Thus, the implementation of the comparison comprises the calculation of a distance between the data, the definition whereof varies based on the nature of the biometric data considered. The calculation of the distance usually comprises the calculation of a polynomial between the components of the biometric data, and advantageously, the calculation of a scaler product.

For example, in a case where the biometric data have been obtained from images of an iris, a conventional distance used for comparing two data is the Hamming distance. In the case where the biometric data have been obtained from images of the individual face, it is common to use the Euclidean distance.

This type of comparison is known to the person skilled in the art and will not be described in more detail hereinafter.

The individual is identified if the comparison reveals a rate of similarity between the candidate data item and a reference data item (referred to as target, as discussed) exceeding a certain threshold, the definition whereof depends on the calculated distance.

Step (b) advantageously comprises previously obtaining the "fresh" candidate biometric data item, typically generated from a biometric trait furnished by biometric acquisition means 23 in the client equipment 2. In other words, the user of the equipment 2 uses an existing automatic device to extract the candidate biometric data item.

It is observed that, alternatively, the obtaining of the candidate biometric data item can be implemented by the terminal 1, that is, the user can use a biometric trait furnished by the biometric acquisition means of his own device 1, but it is preferred to use those in the client equipment 2 so as to avoid the user "falsifying" the biometrics by putting on, i.e., a photograph from another user to impersonate him. In this respect, the biometric acquisition means 23 preferably are capable of detecting a living presence, so as to ensure that the candidate biometric data item is produced from a "real" trait and not from a mask carried by a user with a fraudulent behavior.

Step (b) advantageously comprises, as a preliminary step, the reception of a query by the user for his authentication on the client equipment 2, that is, the implementation of the method may require action by the user. Conventionally, in particular if it is integrated with an existing software solution, it is a combination of keys such as CTRL+ALT+DELETE. From there, the biometric acquisition means 23 can acquire the biometrics of the user on the equipment 2 (who is, therefore, the target user).

It should be noted that it is possible to leave the choice to the user, when he has requested his authentication, either to proceed conventionally (by entering his alphanumeric authentication data) or via the present method, in particular assuming that not all the users would be equipped with a personal terminal 1. However, it is preferable that the solution according to the present method be mandatory so as not to weaken security and ensure strong authentication.

Alternatively to receiving a query, the method may be completely automatic, with, for example, authentication means 23 capable of detecting that a user is positioned to access the equipment 2, which then directly acquires his biometrics. This is typically the case with a fingerprint sensor: as soon as a user places his finger on the sensor, it can be assumed that he wishes to authenticate himself, and thus the client equipment directly initiates his identification.

In all cases, the implementation of step (b) may remain subject to the fact that no user is already authenticated on the client equipment 2, that is, that a session is already logged: it may be decided that the user currently on the equipment 2 must log out in order to attempt to authenticate a new user. Alternatively, each user can access his own session with his own privileges.

In a step (c), the client equipment 2 uses the at least one alphanumeric data item of authentication of the identified user for his authentication.

Step (c) is thus a conventional user authentication step (the alphanumeric authentication data are typically transmitted to the server 3 and compared with expected alphanumeric data), but instead of the user entering his alphanumeric authentication data, the equipment 2 directly uses those retrieved from his terminal 1. In other words, the identified user is finally authenticated by using his at least one alphanumeric authentication data item stored on the data storage means 22 in the client equipment 2.

Although it remains possible at the end of step (b) to have the precise identity of the identified user, it should be noted that advantageously the equipment 2 can be based solely on the result of the identification of step (b).

More specifically, the at least one alphanumeric authentication data item used is preferably the one associated with the "target" reference biometric data item identified in step (b). Indeed, it is known that a reference biometric data item and an alphanumeric authentication data item associated correspond to the same user, in this case the identified user.

In summary, in the preferred embodiment, step (b) finds the identification, among the reference biometric data item(s) stored on the data storage means 22 in the client equipment 2, of the reference biometric data item matching with the candidate biometric data item, and step (c) finds the authentication of the user using the at least one alphanumeric authentication data item associated with the reference biometric data item matching with the candidate biometric data item.

Temporary Nature of the Storage

As explained, the storage on the data storage means 22 in the client equipment 2 of the reference biometric data item of said user, and the at least one alphanumeric authentication data item of the user is temporary.

In this respect, the method comprises a step (d) of deleting the reference biometric data item of said user and at the least one alphanumeric user authentication data item from the data storage 22 means in the client equipment 2.

This step (d) can be implemented in many different ways, preferably in accordance with a predetermined temporal pattern. For instance:

Once authentication has been implemented, the data of the identified user, or even of all users, are deleted; and/or Deletion takes place after a predetermined time after storage on the means 22 in the equipment 2, i.e., after one hour; and/or All data of all users are deleted periodically, i.e., every day at midnight;

Etc.

All schemes are possible, just ensuring that the data is only temporarily stored ensures that users' privacy and IT security are respected.

Equipment and System

According to a second aspect, the client device 2 is proposed for the implementation of the process according to the first aspect, i.e., the authentication of a user.

The client equipment 2 is typically connected to a network 10 (and thus to an authentication server 3), and comprises data storage means 22, advantageously biometric acquisition means 23, as well as data processing means 21 configured to:

When a user's personal terminal 1 is in proximity to said client equipment 2 (for example, connected via a short-range wireless connection, such as BLE) receiving from the terminal 1 and temporarily storing on the data storage means 22:

a reference biometric data item of the said user; and at least one alphanumeric user authentication data item; stored on the data storage means 12 in the terminal 1;

Identifying said user via biometric recognition from a candidate biometric data item of the user and the reference biometric data item(s) stored on the data storage means 22 (where appropriate, after having obtained the candidate biometric data item from a biometric trait acquired by the means 23);

Using the at least one alphanumeric authentication data item of the identified user stored on the data storage means 22 (that is, the one associated with the reference biometric data item identified as matching with the candidate biometric data item), for authentication of said user (for example by sending it to the server 3);

Preferably, deleting said reference biometric data and at least one alphanumeric user authentication data item from the data storage means 22.

According to a third aspect, the authentication system is proposed, that is, the assembly of the client equipment 2 and at least one personal terminal 1 of a user comprising data storage means 12 storing:

a reference biometric data item of the said user; and at least one alphanumeric user authentication data item.

Said system may also comprise the authentication server 3.

Computer Program Product

According to a fourth and a fifth aspects, the invention relates to a computer program product comprising code instructions for execution (in particular on data processing means 21 in the client equipment 2) of a method according to the first aspect of the invention for authentication of a user on client equipment 2, as well as storage means readable by computer equipment (a memory 22 in the equipment 2) on which this computer program product is located.

The invention claimed is:

1. A method of authenticating a user on client equipment (2), the user being equipped with a personal terminal (1), the method comprising implementing by data processing means (21) in said client equipment (2) the following steps:
(a). When said user's personal terminal (1) is in proximity to said client equipment (2), receiving from the terminal (1) and temporarily storing on data storage means (22) in the client equipment (2) of authentication data transmitted by the terminal (1) in a same credential comprising:
a reference biometric data item of the said user; and
at least one alphanumeric user authentication data item encapsulated within the reference biometric data item;
stored on the data storage means (12) in the terminal (1);
(b). Identifying said user via biometric recognition from a candidate biometric data item of the user and the reference biometric data item(s) stored on the data storage means (22) in the client equipment (2);
(c). Once said user has been identified, using at least one alphanumeric authentication data item of the identified user stored on the data storage means (22) in the client equipment (2), for authentication of said user.

2. The method according to claim 1, wherein step (b) comprises identifying, among the reference biometric data item(s) stored on the data storage means (22) in the client equipment (2), the reference biometric data item matching with the candidate biometric data item of the user.

3. The method according to claim 2, wherein the step (b) comprises comparing the candidate biometric data item with every reference biometric data item stored on the data storage means (22) in the client equipment (2).

4. The method according to claim 2, wherein the candidate biometric data item and a reference biometric data item match if a distance between the candidate biometric data item and the reference biometric data item according to a given comparison function is less than a predetermined threshold.

5. The method according to claim 2, wherein the at least one alphanumeric authentication data item used in step (c) is the one associated with said reference biometric data item matching with the candidate biometric data item of the user.

6. The method according to claim 1, comprising a step (d) of deleting said reference biometric data and at least one alphanumeric user authentication data item from the data storage means (22) in the client equipment (2).

7. The method according to claim 6, wherein step (d) is implemented in accordance with a predetermined time pattern.

8. The method according to claim 1, wherein said terminal (1) is determined as being in proximity and step (a) is carried out when a short-range wireless connection is established between the terminal (1) and the client equipment (2), in particular a Bluetooth Low Energy or Ultra-Wide Band connection.

9. The method according to claim 1, wherein the step (b) comprises generating the candidate biometric data item from a biometric trait of the user furnished by biometric acquisition means (23) in the client equipment (2).

10. The method according to claim 1, wherein the method comprises implementing, by data processing means (11) in the terminal (1), a preliminary step (a0) of obtaining at least one alphanumeric authentication data item of the user and generating the reference biometric data item from a reference biometric trait of the user.

11. The method according to claim 10, wherein the step (a0) comprises encrypting said reference biometric data item and at least one alphanumeric user authentication data item with a public key of the client equipment (2), the step (a) comprising a decryption thereof by the data processing means (21) in the client equipment (2) with a private key of the client equipment (2).

12. The method according to claim 1, wherein the at least one alphanumeric user authentication data item comprises a user password or a hash value of a user password.

13. A non-transitory computer program product comprising coding instructions for the execution of a method according to claim 1 for authentication of a user on client equipment (2), when said method is executed on a computer.

14. A storage means readable by a piece of computer equipment, on which storage means a computer program product comprises coding instructions for the execution of a method according to claim 1 for authentication of a user on client equipment (2).

15. Client equipment (2) comprising data storage means (22) and data processing means (21), wherein said data processing means (21) are configured to:

When a user's personal terminal (1) is in proximity to said client equipment (2), receiving from the terminal (1) and temporarily storing on the data storage means (22) authentication data transmitted in a same credential comprising:
   a reference biometric data item of the said user; and
   at least one alphanumeric user authentication data item encapsulated within the reference biometric data item;
   stored on the data storage means (12) in the terminal (1);

Identifying said user via biometric recognition from a candidate biometric data item of the user and the reference biometric data item(s) stored on the data storage means (22);

Once said user has been identified, using at least one alphanumeric authentication data item of the identified user stored on the data storage means (22) for authentication of said user.

16. An assembly comprising client equipment (2) according to claim 15, and at least one user personal terminal (1) comprising data storage means (12) storing:
   a reference biometric data item of the said user; and
   at least one alphanumeric user authentication data item.

* * * * *